Patented Sept. 9, 1930

1,775,370

UNITED STATES PATENT OFFICE

HARRY D. MURRAY, OF GROVE CITY, PENNSYLVANIA, ASSIGNOR, BY MESNE ASSIGNMENTS, TO COOPER-BESSEMER CORPORATION, OF MOUNT VERNON, OHIO, A CORPORATION OF OHIO

FRICTION CLUTCH

Application filed October 28, 1927. Serial No. 229,403.

Friction clutches are usually provided with friction surfaces which surfaces are brought into and out of engagement through the action of a spring. With the present invention the friction surfaces are moved to and out of engagement positively through the action of the clutch mechanism. The clutch also involves improvements in the structural features of the clutch, particularly in utilizing a centrally arranged friction disc with movable friction elements at both sides of the disc so as to permit of the use of a disc with a balanced pressure on both sides thereof. Features and details of the invention will appear more fully from the specification and claims.

A preferred embodiment of the invention is illustrated in the accompanying drawings as follows:—

Figure 1:
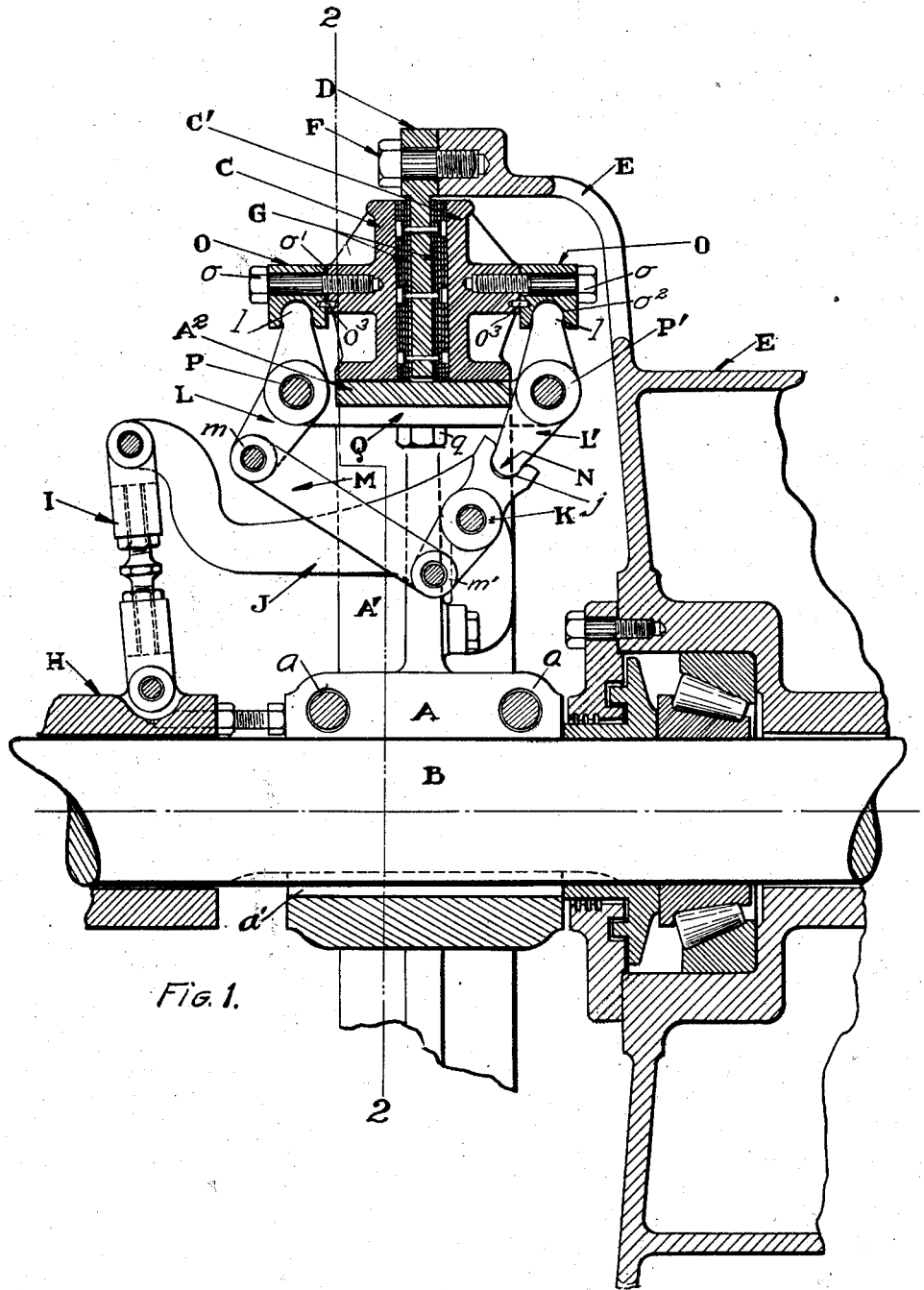
Figure 2:
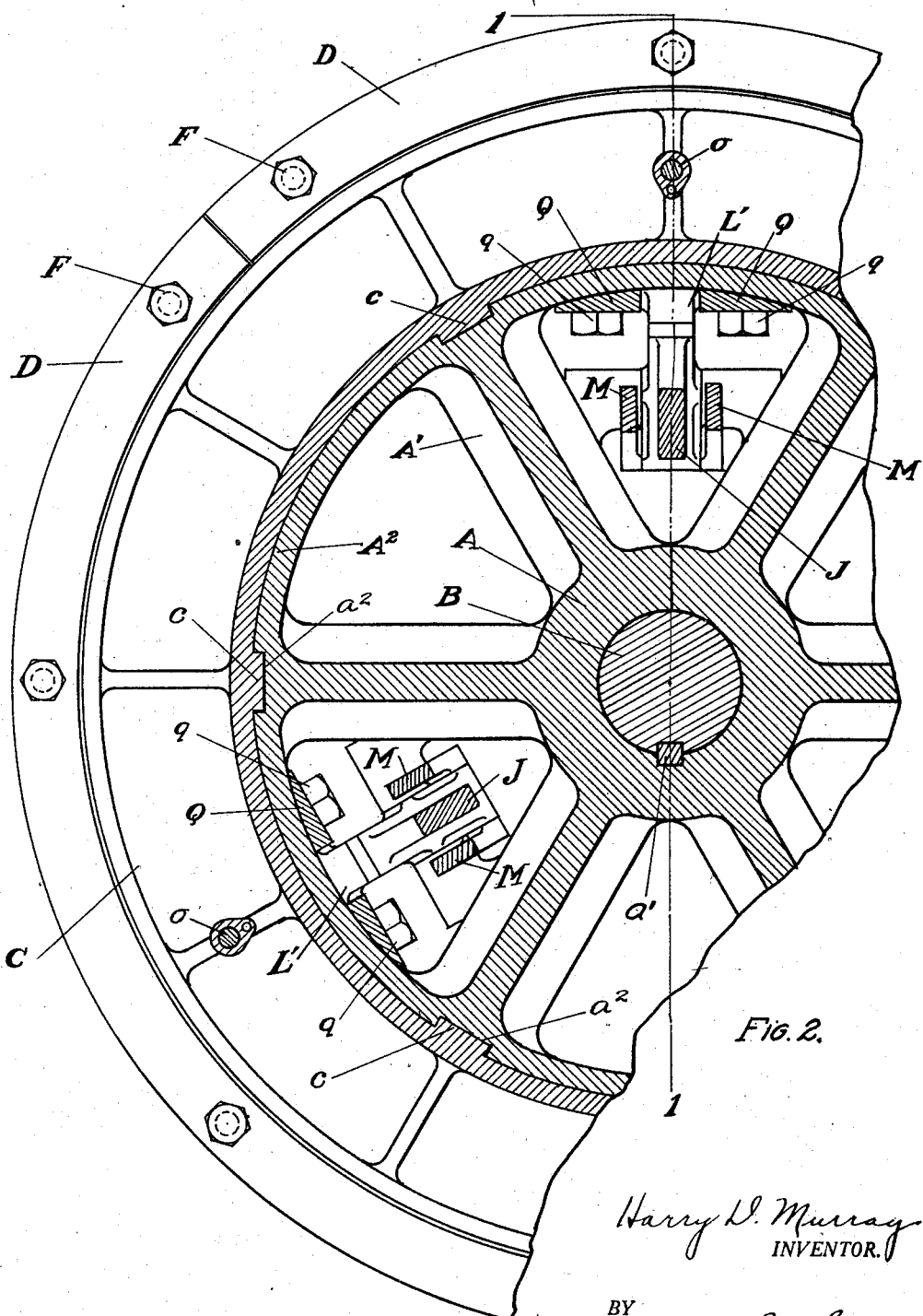

Fig. 1 shows a section of a portion of the clutch on the line 1—1 in Fig. 2.

Fig. 2 a section on the line 2—2 in Fig. 1.

B marks the shaft on which the clutch is mounted. A fixed clutch member is provided with a hub A which is clamped on the shaft by means of clamping screws $a$ and is also secured by a key $a'$. Spokes A′ extend from the hub and a rim $A^2$ is formed on the outer ends of the spokes. The rim is provided with grooves $a^2$. Friction shoes C C′ are mounted on the rim and these are provided with splines $c$ interlocking with the grooves $a^2$, thus locking the shoes against rotation on the rim but permitting of their axial movement.

A friction disc D is arranged between the shoes and it is mounted on a member E which is journaled on the shaft B. The disc D is preferably made in two halves and secured to the member E by bolts F. It is provided with friction strips G of friction material. By making the disc D in parts it may be readily removed for the renewal of the friction strips.

The operating linkage of the clutch comprises the following mechainsm:—A sliding sleeve H is mounted on the shaft B and is operated in any convenient manner. Thrust links I extend radially from the sleeve and engage levers J. The levers J are pivotally mounted on pins K carried by the spokes A′. Rock levers L and L′ are journaled on pins P and P′, the pins being mounted in the brackets Q secured by bolts $q$ to the rim $A^2$. The links M are connected to the levers L by pins $m$ and to the levers J by pins $m'$, the pins $m'$ being below the pivot points K. The levers L′ are connected with the levers J, the ends N of the levers L′ extending into sockets $j$ in the levers J above the pivots K.

Blocks O are secured to the shoes C C′ by means of screws $o$. These blocks are adjusted on the shoes by means of shims $o^4$ which make a convenient but very close adjustment. The blocks are locked against turning by pins $o^3$ and are provided with notches $o^2$ into which the ends $l$ of the levers L L′ extend.

The operation of the clutch is as follows: With the sleeve H in the position shown in Fig. 1 the clutch is set, the sleeve H being moved slightly inwardly sufficient to give to the thrust links I a slight inclination to lock the clutch in set position. To release the clutch the sleeve H is moved outwardly. This draws the outer ends of the levers J inwardly and rocks the pins $m'$ toward the right and the notches $j$ toward the left, thus operating the levers L and L′ in opposite directions, the lower ends of the levers L to the right and the lower ends of the levers L′ toward the left. This swinging of the levers moves the upper ends of the levers L—L′ away from the disc D, carrying with them the shoes C and C′ so as to release the clutch. By reversing the movement of the sleeve H the reversal of the linkage and levers takes place, thus setting the clutch. It will be noted that the clutch is positively released and positively set through the action of the operating mechanism and that the central disc may be axially fixed and the friction shoes moved into engagement with it with a balancing pressure against both sides so that the member E is not subjected to axial thrust as the clutch is set and released.

What I claim as new is:—

1. In a friction clutch, the combination of an intermediate friction member; clutch shoes at each side of the member; and means actuating said shoes simultaneously forcing said shoes into clutching engagement comprising lock levers operating on the shoes, an operating sleeve, and connecting and actuating mechanism between the sleeve and levers, said mechanism comprising intermediate levers, thrust links between the intermediate levers and the sleeve, and connections from opposite sides of the pivots of the intermediate levers and the rock levers, said connections comprising direct interlocking members between one set of rock levers and the intermediate levers and links between the other set of rock levers and the intermediate levers.

2. In a friction clutch, the combination of a friction member in the form of a segmental disc; shoes at each side of the disc; a shoe carrier on which the shoes are splined; adjustable blocks on the shoes having notches; rock levers extending into the notches; intermediate levers; connections between the rock levers and intermediate levers, the connections to the intermediate levers being at opposite sides of the pivots of said intermediate levers; and means actuating the intermediate levers.

In testimony whereof I have hereunto set my hand.

HARRY D. MURRAY.